United States Patent
Fletcher et al.

(10) Patent No.: US 10,519,984 B2
(45) Date of Patent: Dec. 31, 2019

(54) NOISE ATTENUATION IN A VENTURI DEVICE AND/OR CHECK VALVES

(71) Applicants: David E. Fletcher, Flint, MI (US); James H. Miller, Ortonville, MI (US); Rex Bravo, Farmington, MI (US); Andrew D. Niedert, New Hudson, MI (US); Matthew C. Gilmer, Whitmore Lake, MI (US); Keith Hampton, Ann Arbor, MI (US); Nicole Bruder, Harrison Township, MI (US)

(72) Inventors: David E. Fletcher, Flint, MI (US); James H. Miller, Ortonville, MI (US); Rex Bravo, Farmington, MI (US); Andrew D. Niedert, New Hudson, MI (US); Matthew C. Gilmer, Whitmore Lake, MI (US); Keith Hampton, Ann Arbor, MI (US); Nicole Bruder, Harrison Township, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 376 days.

(21) Appl. No.: 14/731,942

(22) Filed: Jun. 5, 2015

(65) Prior Publication Data
US 2015/0354726 A1    Dec. 10, 2015

Related U.S. Application Data

(60) Provisional application No. 62/008,785, filed on Jun. 6, 2014.

(51) Int. Cl.
*F16K 47/04*   (2006.01)
*F16K 15/02*   (2006.01)
(Continued)

(52) U.S. Cl.
CPC .............. *F04F 5/44* (2013.01); *F04B 53/001* (2013.01); *F04F 5/52* (2013.01); *F04F 5/54* (2013.01);
(Continued)

(58) Field of Classification Search
CPC .......... B60T 17/02; B60T 17/008; F01N 1/10; F01N 1/24; F04F 5/16; F04F 5/54;
(Continued)

(56) References Cited

U.S. PATENT DOCUMENTS 1,845,969 A    2/1932  Hueber
2,037,884 A *  4/1936  Day ...................... F02M 35/14
                                                181/229
(Continued)

FOREIGN PATENT DOCUMENTS

CN           2400655       10/2000
CN        201377408 Y       1/2010
(Continued)

OTHER PUBLICATIONS

CN, Office Action with English translation; Chinese Patent Application No. 201480001422.9; 19 pages (dated Feb. 16, 2017).
(Continued)

*Primary Examiner* — Nathan C Zollinger
(74) *Attorney, Agent, or Firm* — FisherBroyles, LLP; Susan M. Oiler

(57) ABSTRACT

Venturi devices for producing vacuum are disclosed that include a housing defining a motive port, a suction port, a discharge port, a first flow passage between the motive port and the discharge port, and a second flow passage into and through the suction port and into fluid communication with the first flow passage, a first check valve incorporated into the housing and positioned to control fluid flow through the suction port, and a sound attenuating wrap about the outer (Continued)

surface of the housing. The Venturi devices may also include a sound attenuating member disposed in the first flow passage downstream of the intersection of the second flow passage and the first flow passage, in the portion of the second flow passage leading into the suction port, in the first check valve, or combinations thereof.

12 Claims, 9 Drawing Sheets

(51) Int. Cl.
| | |
|---|---|
| F04B 53/00 | (2006.01) |
| F04F 5/54 | (2006.01) |
| F04F 5/52 | (2006.01) |
| F04F 5/44 | (2006.01) |
| F04F 5/20 | (2006.01) |
| F16K 47/08 | (2006.01) |

(52) U.S. Cl.
CPC .............. *F16K 47/04* (2013.01); *F16K 47/08* (2013.01); *F04F 5/20* (2013.01); *F05C 2253/14* (2013.01); *F16K 15/02* (2013.01); *Y10T 137/7904* (2015.04)

(58) Field of Classification Search
CPC ....... F04F 5/20; F04F 5/52; F04F 5/44; F16K 47/04; F16K 15/02; F16K 47/08; F04B 53/001; F05C 2253/14; Y10T 137/7904
USPC .......................................... 181/198, 200, 202
See application file for complete search history.

(56) References Cited

U.S. PATENT DOCUMENTS

| | | | |
|---|---|---|---|
| 3,234,932 A | 2/1966 | Bird et al. | |
| 3,430,437 A | 3/1969 | Saussele et al. | |
| 3,581,850 A | 6/1971 | Jaitl | |
| 3,754,841 A | 8/1973 | Grabb et al. | |
| 3,765,505 A | 10/1973 | Pendelton | |
| 3,826,281 A | 7/1974 | Clark | |
| 4,196,793 A | 4/1980 | Teodrescu | |
| 4,204,410 A * | 5/1980 | Kunz .................. | F25B 1/08 62/500 |
| 4,211,200 A | 7/1980 | Rocchio et al. | |
| 4,354,492 A | 10/1982 | McPhee | |
| 4,499,034 A | 2/1985 | McAllister | |
| 4,499,916 A * | 2/1985 | Hanson ................. | F02P 5/103 137/103 |
| 4,519,423 A | 5/1985 | Ho et al. | |
| 4,519,523 A | 5/1985 | Ho | |
| 4,531,624 A | 7/1985 | Ideta | |
| 4,554,786 A | 11/1985 | Takeuchi et al. | |
| 4,595,073 A | 6/1986 | Thawani | |
| 4,683,916 A | 8/1987 | Raines | |
| 4,759,691 A * | 7/1988 | Kroupa .................. | F04F 5/467 417/174 |
| 4,893,654 A | 1/1990 | Feuz | |
| 4,951,708 A | 8/1990 | Miller | |
| 5,108,266 A | 4/1992 | Hewitt | |
| 5,188,141 A | 2/1993 | Cook et al. | |
| 5,277,468 A * | 1/1994 | Blatt .................... | B65G 47/911 294/64.2 |
| 5,291,916 A | 3/1994 | Kloosterman et al. | |
| 5,683,227 A * | 11/1997 | Nagai ...................... | F04F 5/22 417/174 |
| 5,816,446 A | 10/1998 | Steindoft | |
| 5,896,882 A * | 4/1999 | McGrath, Jr. ........... | G06T 15/80 137/111 |
| 6,035,881 A * | 3/2000 | Emmerich .............. | B60T 17/02 137/113 |
| RE37,090 E | 3/2001 | Kloosterman et al. | |
| 6,220,271 B1 | 4/2001 | Emmerich et al. | |
| 6,394,225 B1 | 5/2002 | Yasuda | |
| 7,029,103 B2 | 4/2006 | Iida | |
| 7,610,140 B2 | 10/2009 | Hirooka | |
| 7,628,170 B2 | 12/2009 | Kok-Hiong et al. | |
| 7,673,653 B2 | 3/2010 | Mijers et al. | |
| 7,722,132 B2 | 5/2010 | Carlsson | |
| 8,517,056 B2 | 8/2013 | Cullin | |
| 9,153,225 B2 * | 10/2015 | Bonifas .................. | G10K 11/16 |
| 9,534,704 B2 * | 1/2017 | Hampton ................ | F16K 47/08 |
| 9,827,963 B2 | 11/2017 | Fletcher et al. | |
| 10,024,458 B2 * | 7/2018 | Niedert ............ | F02M 35/10118 |
| 2005/0061378 A1 | 3/2005 | Foret | |
| 2005/0121084 A1 | 6/2005 | Andersson | |
| 2006/0016477 A1 | 1/2006 | Zaparackas | |
| 2008/0007113 A1 | 1/2008 | Choi | |
| 2008/0060378 A1 | 3/2008 | Gocho et al. | |
| 2008/0121480 A1 | 5/2008 | Kawamori et al. | |
| 2008/0145238 A1 | 6/2008 | Shibayama et al. | |
| 2011/0132311 A1 | 6/2011 | Pursifull et al. | |
| 2011/0186151 A1 * | 8/2011 | Sparazynski ........... | B60T 17/02 137/526 |
| 2012/0024249 A1 | 2/2012 | Fuhrmann et al. | |
| 2013/0139911 A1 | 6/2013 | Wilson et al. | |
| 2013/0213510 A1 | 8/2013 | Burnham et al. | |
| 2013/0233276 A1 | 9/2013 | Pursifull et al. | |
| 2013/0233287 A1 | 9/2013 | Leone | |
| 2014/0014080 A1 | 1/2014 | Beshay et al. | |
| 2014/0165962 A1 | 6/2014 | Pursifull | |
| 2015/0240838 A1 * | 8/2015 | Watanabe ................. | F04F 5/54 417/151 |
| 2015/0285401 A1 * | 10/2015 | Niedert ............ | F02M 35/10118 137/484.2 |

FOREIGN PATENT DOCUMENTS

| | | |
|---|---|---|
| CN | 201907500 | 7/2011 |
| CN | 103407441 A | 11/2013 |
| CN | 103732903 A | 4/2014 |
| DE | 4310761 | 10/1994 |
| DE | 19512700 A1 | 10/1996 |
| EP | 0442582 A1 | 8/1991 |
| EP | 1302671 A1 | 4/2003 |
| FR | 2952978 A1 | 5/2011 |
| GB | 2129516 | 5/1984 |
| JP | S42-27133 | 12/1967 |
| JP | S49-89441 | 2/1976 |
| JP | S51-15206 A | 2/1976 |
| JP | S52-25553 | 2/1977 |
| JP | H01-111878 U | 7/1989 |
| JP | 2001-012349 A | 1/2001 |
| JP | 2001-295800 | 10/2001 |
| JP | 2009168134 | 7/2009 |
| WO | 2007/050011 A1 | 5/2007 |
| WO | 2008/014306 A2 | 1/2008 |
| WO | 2009099399 | 8/2009 |

OTHER PUBLICATIONS

EP, Supplementary European Search Report; Patent Application No. 14811266.7; 5 pages (dated Apr. 5, 2017).
EP, Extended European Search Report; Patent Application No. 14852220.4, Applicant Dayco IP Holdings, LLC, 6 pages (dated May 10, 2017).
CN, Office Action with English translation; Chinese Patent Application No. 2015800002870, Applicant Dayco IP Holdings, LLC, 13 pages (dated Jun. 19, 2017).
CN, Search Report with English translation; Chinese Patent Application No. 2015800002870, Applicant Dayco IP Holdings, Llc, 4 pages (dated Jun. 19, 2017).
U.S., Final Office Action; U.S. Appl. No. 14/294,727; (dated Apr. 22, 2016).
U.S., Final Office Action; U.S. Appl. No. 14/509,612; (dated Jun. 22, 2016).
CN, Search Report with English translation; Chinese Patent Application No. 201480001422.9; (dated Jul. 20, 2016).
CN, Office Action with English translation; Chinese Patent Application No. 201480001422.9; (dated Aug. 1, 2016).

(56) References Cited

OTHER PUBLICATIONS

U.S., Final Office Action; U.S. Appl. No. 14/600,598; (dated Aug. 19, 2016).

CN, Office Action and Search Report with English translation; Chinese Patent Application No. 201410413220.7; (dated Nov. 14, 2016).

U.S., Advisory Action; U.S. Appl. No. 14/509,612; (dated Sep. 1, 2016).

U.S., Notice of Allowance; U.S. Appl. No. 14/509,612; (dated Oct. 17, 2016).

PCT, International Search Report and Written Opinion, PCT/US2014/041250 (dated Oct. 27, 2014).

PCT, International Search Report and Written Opinion, PCT/US2014/059672 (dated Jan. 9, 2015).

PCT, International Search Report and Written Opinion, PCT/US2015/024195 (dated Jul. 24, 2015).

PCT, International Search Report and Written Opinion, PCT/US2015/033079 (dated Aug. 21, 2015).

PCT, International Search Report and Written Opinion, PCT/US2015/039950 (dated Oct. 5, 2015).

PCT, International Search Report and Written Opinion, PCT/US2015/034420 (dated Oct. 28, 2015).

U.S., Non-Final Office Action, U.S. Appl. No. 14/294,727 (dated Oct. 8, 2015).

EP; European Supplemental Search Report; European Application No. 15803463.7 (dated May 3, 2018).

CN; Chinese Office Action with English Translation; Chinese Application No. 201580000287.0 (dated May 31, 2018).

JP, Non-Final Office Action with English Translation; Japanese Application No. 2016-519556 (dated May 18, 2018).

U.S., First Office Action, U.S. Appl. No. 15/791,561 (dated Jul. 26, 2018).

JP, First Office Action with English Translation; Japanese Application No. 2016-521267 (dated Sep. 11, 2018).

JP, First Office Action With English Translation; Japanese Application No. 2016-571206 (dated Apr. 3, 2019).

JP, Second Office Action With English Translation; Japanese Application No. 2016-521267 (dated Apr. 5, 2019).

JP, Non-final Office Action with English Translation; Japanese Application No. 2016-571206 (dated Aug. 29, 2019).

JP, Third Office Action with English Translation; Japanese Application No. 2016-571206 (dated Nov. 13, 2019) (9 Pages).

* cited by examiner

NOISE ATTENUATION IN A VENTURI DEVICE AND/OR CHECK VALVES

RELATED APPLICATIONS

This application claims the benefit of U.S. Provisional Application No. 62/008,785, filed Jun. 6, 2014, which is incorporated herein by reference in its entirety.

TECHNICAL FIELD

This application relates to noise attenuation in Venturi devices for producing vacuum using the Venturi effect and/or check valves, and more particularly to noise attenuating wraps for use in conjunction therewith.

BACKGROUND

Engines, for example vehicle engines, have included aspirators or ejectors for producing vacuum, and/or check valves. Typically, the aspirators are used to generate a vacuum that is lower than engine manifold vacuum by inducing some of the engine air to travel through a venturi. The aspirators may include check valves therein or the system may include separate check valves. When the check valves are separate, they are typically included downstream between the source of vacuum and the device using the vacuum.

During most operating conditions of an aspirator or check valve, the flow is classified as turbulent. This means that, in addition to the bulk motion of the air, there are eddies superimposed. These eddies are well known in the field of fluid mechanics. Depending on the operating conditions, the number, physical size and location of these eddies are continuously varying. One result of these eddies being present on a transient basis is that they generate pressure waves in the fluid. These pressure waves are generated over a range of frequencies and magnitudes. When these pressure waves travel through the connecting holes to the devices using this vacuum, different natural frequencies can become excited. These natural frequencies are oscillations of either the air or the surrounding structure. If these natural frequencies are in the audible range and of sufficient magnitude, then the turbulence generated noise may be heard, under the hood and/or in the passenger compartment. Such noise is undesirable and new aspirators, ejectors, and/or check valves are needed to eliminate or reduce this type of noise.

SUMMARY

In one aspect, Venturi devices for producing vacuum are disclosed that overcome the problems with turbulence generated noise identified above. The Venturi devices include a housing defining a motive port, a suction port, a discharge port, a first flow passage between the motive port and the discharge port, and a second flow passage into and through the suction port and into fluid communication with the first flow passage, a first check valve incorporated into the housing and positioned to control fluid flow through the suction port, and a sound attenuating material about the outer surface of the housing. The Venturi devices may also include a sound attenuating member disposed in the first flow passage downstream of the intersection of the second flow passage and the first flow passage, in the portion of the second flow passage leading into the suction port, in the first check valve, or combinations thereof.

The sound attenuating material about the outer surface of the housing includes a first member conformed to the contours of the exterior surface of the housing and a second member surrounding the first member; thus, rendering the first member interposed between the housing and the second member. In one embodiment, the first member is a foamable material. In a second embodiment, the first member is molded to the contours of the exterior surface of the housing, and defines a more uniform outer surface once molded thereto. In one embodiment, the first member and the second member comprise different materials.

In another embodiment, the sound attenuating material about the outer surface of the housing is molded to the contours of the exterior surface of the housing, and defines a more uniform outer surface once molded thereto. In another embodiment, the sound attenuating material about the outer surface of the housing comprises a plurality of molded portions each having an inner surface contoured to match the contours of a portion of the exterior surface of the housing. The plurality of molded portions are seated against the exterior surface of the housing and are connected together and/or to the housing by a retention mechanism. In both of these embodiments, the sound attenuating wrap about the more uniform outer surface defined by the molded material or molded portions is optional.

The sound attenuating member(s) positioned inside the Venturi devices may be a plug of sound attenuating material. This plug of sound attenuating material may be disposed within the first flow passage, the second flow passage, or both thereof. In one embodiment, the sound attenuating member is porous such that fluid flow through the first flow passage, the second flow passage, and the check valve is not restricted. The sound attenuating member may comprise metals, plastics, ceramics, or glass. In one embodiment, the sound attenuating member comprises wire, woven or matted, sintered particles, woven or matted fibers, and combinations thereof.

In another aspect, check valves are disclosed that overcome the problems with turbulence generated noise identified above. Such check valves include a housing defining an internal cavity having a first port and a second port both in fluid communication therewith, a sealing member that is translatable between an open position and a closed position within the cavity, a sound attenuating member disposed within the cavity, within the first port, the second port, or both ports, and combinations thereof, and a sound attenuating material about the outer surface of the housing.

The sound attenuating material about the outer surface of the housing includes a first member conformed to the contours of the exterior surface of the housing and a second member surrounding the first member; thus, rendering the first member interposed between the housing and the second member. In one embodiment, the first member is a foamable material. In a second embodiment, the first member is molded to the contours of the exterior surface of the housing, and defines a more uniform outer surface once molded thereto. In one embodiment, the first member and the second member comprise different materials.

In another embodiment, the sound attenuating material about the outer surface of the housing is molded to the contours of the exterior surface of the housing, and defines a more uniform outer surface once molded thereto. In another embodiment, the sound attenuating material about the outer surface of the housing comprises a plurality of molded portions each having an inner surface contoured to match the contours of a portion of the exterior surface of the housing. The plurality of molded portions are seated against the exterior surface of the housing and are connected together and/or to the housing by a retention mechanism. In both of these embodiments, the sound attenuating wrap about the more uniform outer surface defined by the molded material or molded portions is optional.

The sound attenuating member(s) positioned inside the check valves may be a plug of sound attenuating material. This plug of sound attenuating material may be disposed within the first flow passage, the second flow passage, or both thereof. In one embodiment, the sound attenuating member is porous such that fluid flow through the first flow passage, the second flow passage, and the check valve is not restricted. The sound attenuating member may comprise metals, plastics, ceramics, or glass. In one embodiment, the sound attenuating member comprises wire, woven or matted, sintered particles, woven or matted fibers, and combinations thereof.

DETAILED DESCRIPTION

Figure 1:
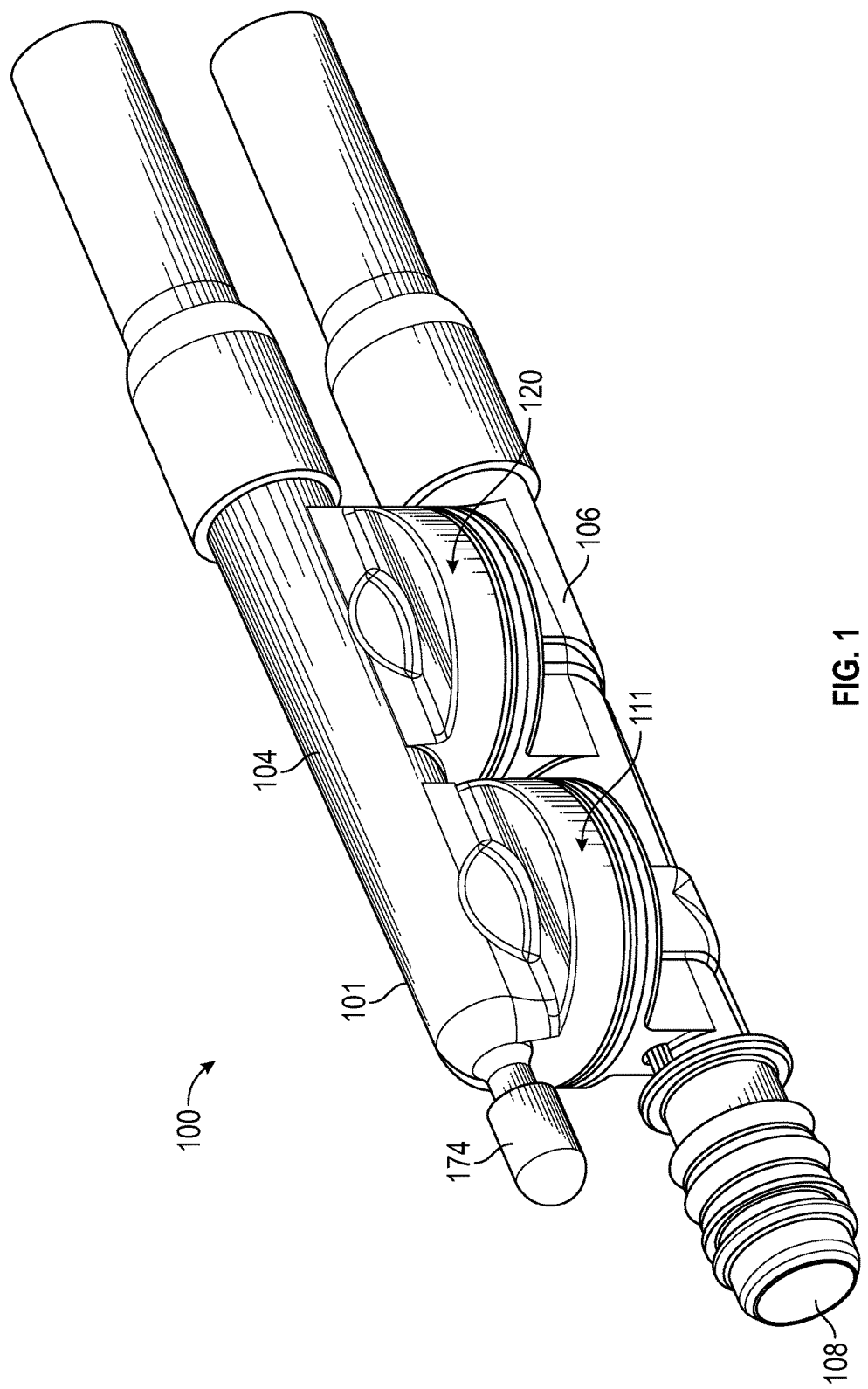
FIG. 1 is a side, perspective view of one embodiment of an aspirator for attenuating noise from turbulent air flow.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

FIG. 1 is an external view of an aspirator-check valve assembly, generally identified by reference number 100, for use in an engine, for example, in a vehicle's engine. The engine may be an internal combustion engine that includes a device requiring a vacuum. Check valves are normally employed in vehicle systems in the air flow lines between the intake manifold, downstream of the throttle, and the devices requiring vacuum. The engine and all its components and/or subsystems are not shown in the figures, with the exception of a few boxes included to represent specific components of the engine as identified herein, and it is understood that the engine components and/or subsystems may include any commonly found in vehicle engines. While the embodiments in the figures are referred to as aspirators because the motive port 108 is connected to atmospheric, the embodiments are not limited thereto. In other embodiments, the motive port 108 may be connected to boosted pressure such as the pressures attributed to boosted air produced by a turbocharger and, as such, the "aspirator" is now preferably referred to as an ejector.

Figure 2:
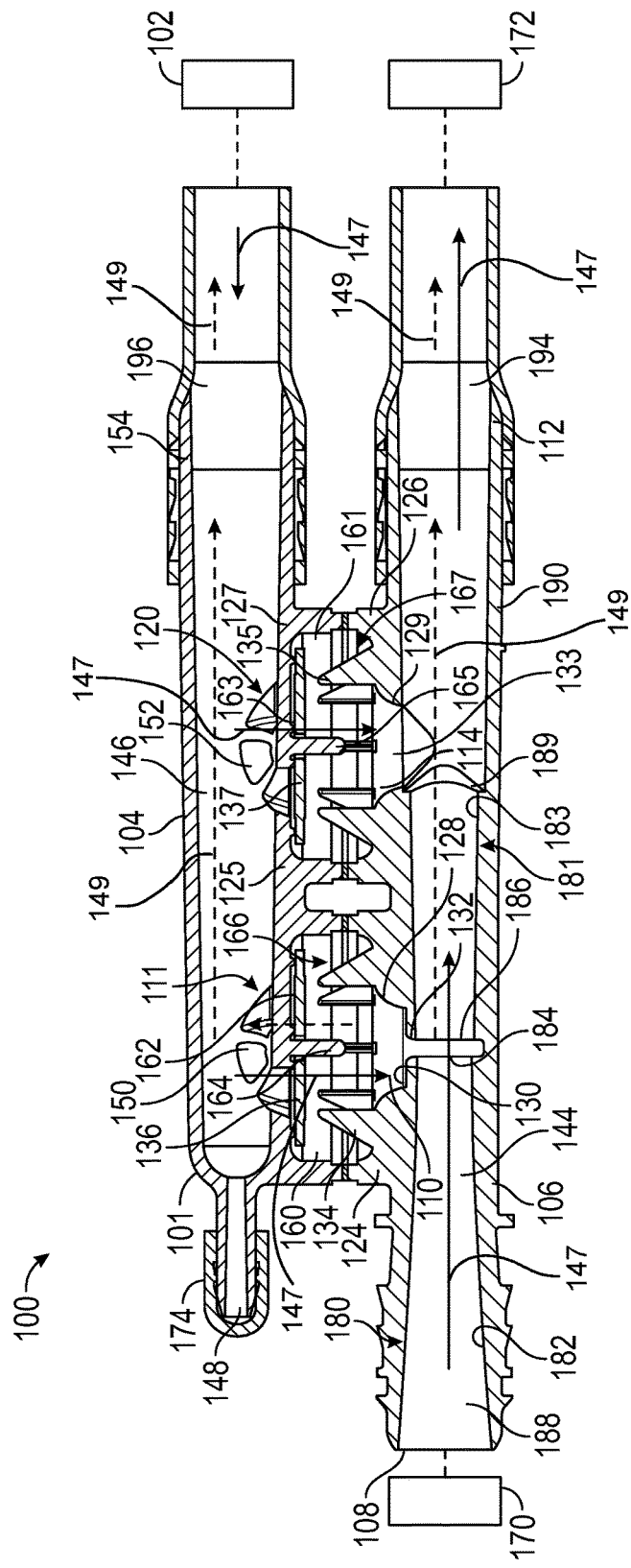
FIG. 2 is a side, longitudinal cross-sectional plan view of the aspirator of FIG. 1.
Figure 3:
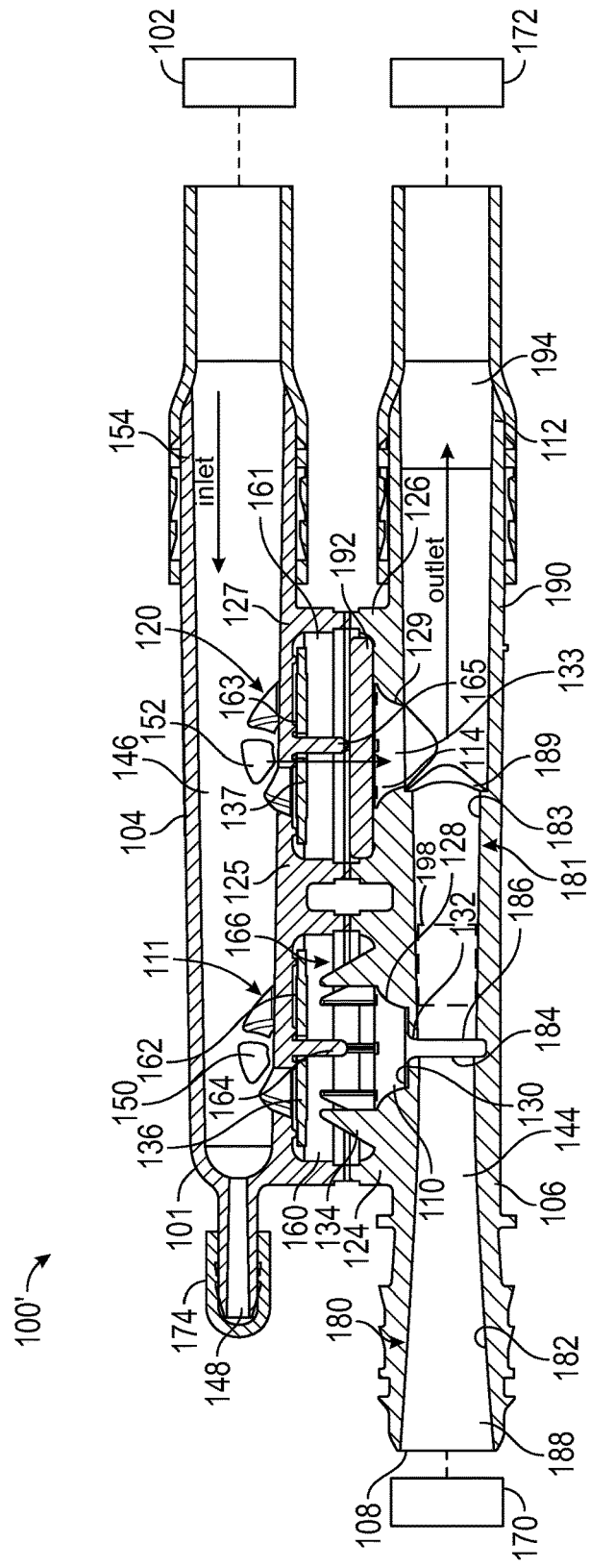
FIG. 3 is a side, longitudinal cross-sectional plan view of another embodiment of an aspirator for attenuating noise from turbulent air flow.

The aspirator-check valve assemblies disclosed herein may have alternate embodiments such as the embodiment of FIGS. 1 and 2 and the embodiment of FIG. 3, which are identified by reference numbers 100, 100', respectively. Both aspirator-check valve assemblies 100, 100' are connectable to a device requiring a vacuum 102 and create vacuum for said device 102 by the flow of air through a passageway 144, extending generally the length of a portion of the aspirator-check valve assembly, designed to create the Venturi effect. The aspirator-check valve assemblies 100, 100' include housing 101, which as illustrated is formed of an upper housing portion 104 and a lower housing portion 106. The designations of upper and lower portions are relative to the drawings as oriented on the page, for descriptive purposes, and are not limited to the illustrated orientation when utilized in an engine system. Preferably, upper housing portion 104 is joined to lower housing portion 106 by sonic welding, heating, or other conventional methods for forming an airtight seal therebetween.

Still referring to FIGS. 1-3, the lower housing portion 106 defines passageway 144 which includes a plurality of ports, some of which are connectable to components or subsystems of the engine. The ports include: (1) a motive port 108, which may receive clean air from the engine intake air cleaner 170, typically obtained upstream of the throttle of the engine; (2) a suction port 110, which can connect via the check valve 111 to a device requiring vacuum 102; (3) a discharge port 112, which may be connected to an engine intake manifold 172 downstream of the throttle of the engine; and, optionally, (4) a bypass port 114. Check valve 111 is preferably arranged to prevent fluid from flowing from the suction port 110 to the application device 102 when a sealing member 136 housed therein is translated to a closed position. In one embodiment, the device requiring vacuum 102 is a vehicle brake boost device. The bypass port 114 may be connected to the device requiring vacuum 102 and, optionally, may include a check valve 120 in the fluid flow path therebetween. Check valve 120 is preferably arranged to prevent fluid from flowing from the bypass port 114 to the application device 102 when a sealing member 137 housed therein is translated to a closed position.

As shown in FIGS. 2 and 3, lower housing portions 106 in both embodiments include lower valve seats 124, 126. Each lower valve seat 124, 126 is defined by a continuous outer wall 128, 129, and, optionally, a bottom wall such as wall 130 in lower valve seat 124. A bore 132, 133 is defined in each lower valve seat 124, 126 to allow for air flow communication with air passageway 144. In FIG. 2, each lower valve seat 124, 126 includes a plurality of radially spaced fingers 134, 135 extending upwardly from an upper surface thereof. The radially spaced fingers 134, 135 serve to support a sealing member 136, 137. In FIG. 3, only one of the lower valve seats, specifically lower valve seat 124, includes a plurality of radially spaced fingers 134. The second lower valve seat 126 includes a first sound attenuating member 192 rather than the plurality of radially spaced fingers. In another embodiment, not shown, both of the lower valve seats 124, 126 may include sound attenuating members rather than the plurality of radially spaced fingers.

Referring again to FIGS. 1-3, the upper housing portion 104 is configured for mating to or with the lower housing portion 106 to form the check valves 111, 120, if both are present. Upper housing portion 104 defines passageway 146 extending the length thereof and defines a plurality of ports, some of which are connectable to components or subsystems of the engine. The ports include: (1) a first port 148 that may be capped with cap 174 or may be connected to a component or subsystem of the engine; (2) a second port 150 (part of the inlet port for chamber/cavity 166) in fluid communication with the suction port 110 in the lower housing portion 106, and between which the sealing member 136 is disposed; (3) a third port 152 (part of the inlet port for chamber/cavity 167) in fluid communication with the bypass port 114 in the lower housing portion 106, and between which the seal member 137 is disposed; and (4) a fourth port 154 which may function as an inlet connecting the aspirator-check valve assembly to a device requiring vacuum 102.

As shown in FIGS. 2 and 3, the upper housing portion 104 in both embodiments includes upper valve seats 125, 127. Each upper valve seat 125, 127 is defined by continuous outer wall 160, 161 and bottom wall 162, 163. Both upper valve seats 125, 127 may include a pin 164, 165 extending downwardly from the bottom walls 162, 163, respectively, toward the lower housing portion 106. The pins 164, 165 function as a guide for translation of the sealing members 136, 137 within the cavities 166, 167 defined by the mated upper valve seat 125 with the lower valve seat 124 and defined by the mated upper valve seat 127 with the lower valve seat 126. Accordingly, each sealing member 136, 137 includes a bore therethrough sized and positioned therein for receipt of the pin 164,165 within its respective cavity 166, 167.

Figure 4:
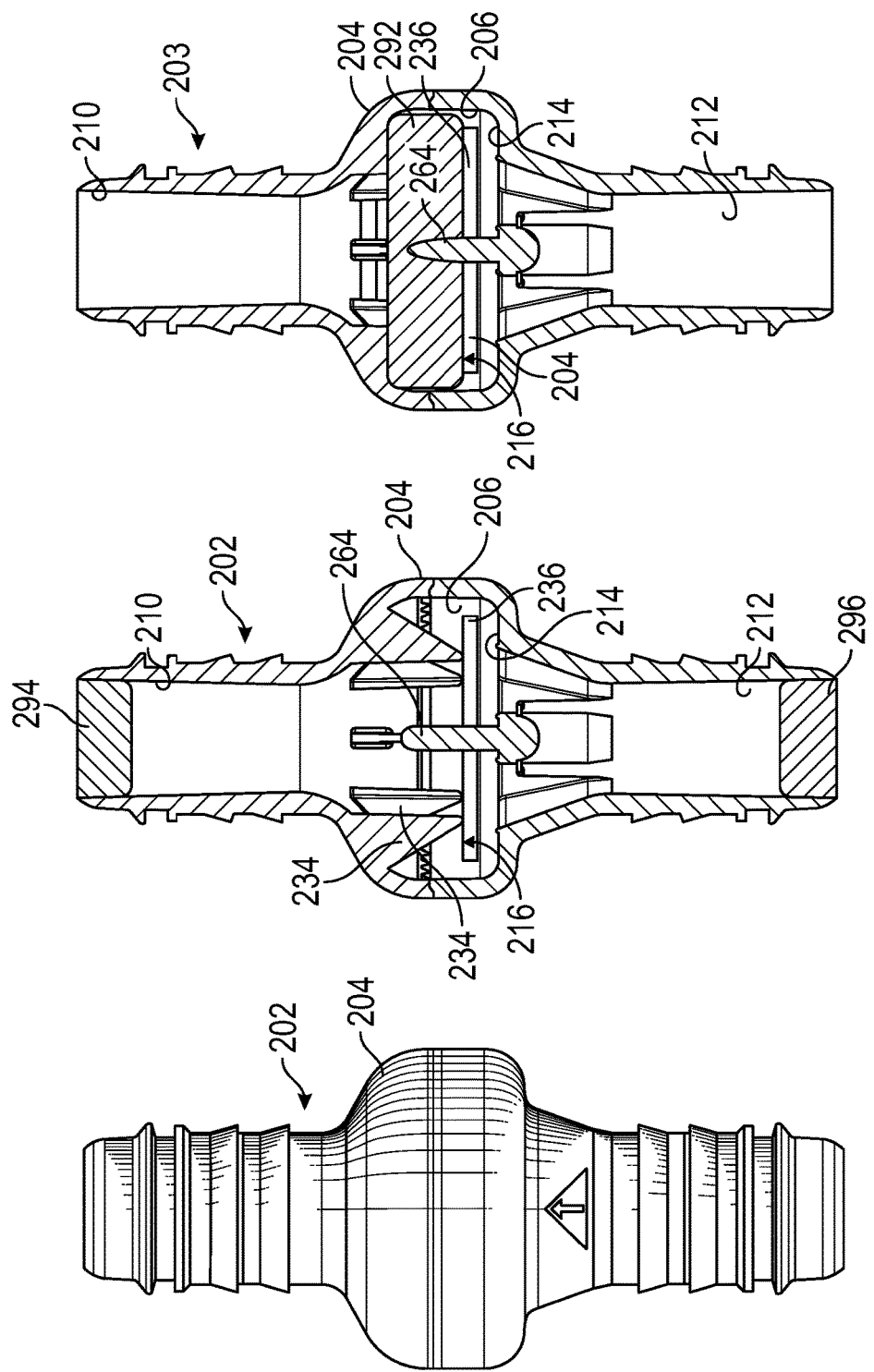
FIG. 4A is a front perspective view of a check valve.
FIG. 4B is a longitudinal, cross-sectional view of the check valve of FIG. 4A.
FIG. 4C is a longitudinal, cross-sectional view of a second embodiment of a check valve having the exterior configuration shown in FIG. 4A.

Referring again to FIGS. 2 and 3, the passageway 144 in the lower housing portion 106 has an inner dimension along a central longitudinal axis B (labeled in FIG. 3) that includes a first tapering portion 182 (also referred to herein as the motive cone) in the motive section 180 of the lower housing portion 106 coupled to a second tapering portion 183 (also referred to herein as the discharge cone) in the discharge section 181 of the lower housing portion 106. Here, the first tapering portion 182 and the second tapering portion 183 are aligned end to end (outlet end 184 of the motive section 180 to inlet end 186 of the discharge section 181). The inlet ends 188, 186 and the outlet ends 184, 189 may be any circular shape, ellipse shape, or some other polygonal or curved form and the gradually, continuously tapering inner dimension extending therefrom may define, but is not limited to, a hyperboloid or a cone. Some example configurations for the outlet end 184 of the motive section 180 and inlet end 186 of the discharge section 181 are presented in FIGS. 4-6 of co-pending U.S. patent application Ser. No. 14/294,727, filed Jun. 3, 2014, incorporated by reference herein in its entirety.

As seen in FIGS. 2 and 3, the first tapering portion 182 terminates at a fluid junction with suction port 110, which is in fluid communication therewith, and at this junction the second tapering portion 183 begins and extends away from the first tapering portion 182. The second tapering portion 183 is also in fluid communication with the suction port 110. The second tapering portion 183 then forms a junction with the bypass port 114 proximate the outlet end 189 of the second tapering portion and is in fluid communication therewith. The first and second tapering portions 182,183 typically share the central longitudinal axis B of the lower housing portion 106.

Still referring to FIGS. 2 and 3, the second tapering portion 183 tapers gradually, continuously from a smaller dimensioned inlet end 186 to a larger dimensioned outlet end 189. This inner dimension may be any circular shape, ellipse shape, or some other polygonal or curved form, including but not limited to a hyperboloid or a cone. The optional bypass port 114 intersects the discharge section 190 as described above to be in fluid communication with the second tapering section 183. The bypass port 114 may intersect the second tapering section 183 adjacent to, but downstream of the outlet end 189. The lower housing portion 106 may thereafter, i.e., downstream of this intersection of the bypass port, continue with a cylindrically uniform inner diameter until it terminates at the discharge port 112. Each of the respective ports 108, 110, 112, and 114 may include a connector feature on the outer surface thereof for connecting the passageway 144 to hoses or other features in the engine.

When either of the aspirator-check valve assemblies 100, 100' is connected into an engine system, for example as illustrated in FIGS. 2 and 3, the check valves 111 and 120 function as follows. As the engine operates, the intake manifold 172 draws air into the motive port 180, through passageway 144 and out the discharge port 112. This creates a partial vacuum in the check valves 111, 120 and passageway 146 to draw sealing members 136, 137 downward against the plurality of fingers 134, 135 (FIG. 2) or against the plurality of fingers 134 and the first sound attenuating member 192 (FIG. 3). Due to the spacing of fingers 134, 135 and/or the porous nature of the first sound attenuating member 192, free fluid flow from passageway 144 to passageway 146 is allowed. The partial vacuum created by the operation of the engine serves in the vacuum assistance of at least the operation of the device requiring vacuum 102.

The air flow system in the typical internal combustion engine operates on the principle that as the engine operates, a partial vacuum is created in order to regulate the power produced by the engine. This vacuum has been found to be useful in supplementing vacuum assist subsystems in the vehicle, particularly brakes, fuel vapor purging systems, automatic transmissions and, most recently, air conditioners. Aspirator-check valve assemblies such as assemblies 100, 100' may provide a connection between the main airway and the subsystem and serve to inhibit back pressure from the subsystem from disturbing airflow through the main airway.

With reference to FIG. 2, the solid arrows 147 represent the fluid flow within the aspirator-check valve assembly and the dashed arrows 149 represent the path for travel of the turbulence generated noise. The fluid flow within the aspirator-check valve assemblies described above is generally classified as turbulent. This means that in addition to the bulk motion of the fluid flow along arrows 147, such as air, there are pressure waves traveling through the assembly and different natural frequencies can become excited, thereby resulting in turbulence generated noise along dashed arrows 149. The aspirator-check valve assemblies 100, 100' as seen in FIGS. 2 and 3 include one or more sound attenuating members, 192, 194, 196, 198. The sound attenuating members 192, 194, 196, 198 are placed within the flow path proximate, but downstream of the regions where turbulence generated noise is created.

The sound attenuating members 192, 194, 196, 198 are porous such that fluid flow through and between the passageways 144, 146 is not restricted, but sound (turbulence generated noise) is attenuated. As depicted in FIG. 2, there are two potential paths for the turbulence generated noise: (1) toward the engine intake manifold 172; and (2) toward the device requiring vacuum 102. To eliminate or reduce this noise, the porous elements are proximate but downstream of the source of the turbulent noise. For example, the sound attenuating members may be positioned in the discharge port, the suction port, proximate the bypass check valve 120, and/or proximate the suction check valve 111.

The check valves 111, 120 can produce turbulent noise due to the flow therethrough. This noise would travel down either of the two connections as depicted by dashed arrows 149 (FIG. 2) along passageways 144 and 146. Sound attenuating members 194, 196, 198 may be placed in either of the passageways 144, 146, and sound attenuating member 192 may be placed in check valve 120. As seen in FIG. 2, the second sound attenuating member 194 is disposed proximate to or in the discharge port 112 because the discharge section 190 is one portion where such noise is created. Also in FIG. 2, the third sound attenuating member 196 is present and is disposed proximate to or in the fourth port 154 of passageway 146 because the flow path between the bypass port 114, check valve 120, and the fourth port 154 is one portion where such noise is created. As discussed above and illustrated in FIG. 3, the first sound attenuating member 192 is disposed within the cavity 167 of check valve 120, specifically seated within the lower valve seat 126.

The sound attenuating members 192, 194, 196 are porous as explained above and can be made from a variety of materials including metals, plastics, ceramics, or glass. The sound attenuating members may be made from wire, woven or matted, sintered particles, fibers woven or matted, but are not limited thereto. The porous character of the sound attenuating members causes the noise pressure waves to attenuate by interfering with themselves, but should be of sufficient size and shape to not unduly restrict fluid flow, for example, air flow. In one embodiment, the sound attenuating members 192, 194, 196 are not harmed (do not deteriorate) by operating temperatures of an engine based on placement of the aspirator in the engine system. Additionally, the sound attenuating members 192, 194, 196 are not harmed by vibrations experienced during operating conditions of the engine.

Referring now to FIGS. 4A-4C, stand-alone check valves 202, 203 are shown that are independent of an aspirator assembly. The check valve 202 includes a housing 204 defining an internal cavity 206 having a pin 264 therein upon which is seated a sealing member 236 and defining a first port 210 in fluid communication with the internal cavity 206 and a second fluid port 212 in fluid communication with the internal cavity 206. The internal cavity 206 typically has larger dimensions than the first port 210 and the second port 210. In the illustrated embodiments, the first port 210 and the second port 212 are positioned opposite one another to define a generally linear flow path through the check valve 202, when the sealing member 136 is not present, but is not limited to this configuration. The portion of the housing defining the internal cavity 106 includes an internal first seat 214 upon which the sealing member 236 seats when the check valve is closed and a second seat 216 upon which the sealing member 236 seats when the check valve is open. In FIG. 4B, the second seat 216 is a plurality of radially spaced fingers 234 extending into the internal cavity 206 from an interior surface of the internal cavity 206 that is more proximate the first port 210. In FIG. 4C, the second seat 216 is a face or surface of a first sound attenuating member 292.

As shown in FIGS. 4B and 4C, the check valves 202, 203 each include at least one sound attenuating member. As discussed above, the first sound attenuating member 292 (FIG. 4C) may be positioned in the internal cavity 206 and provide the second seat 216 for the sealing member 236. A second sound attenuating member 294 may be included as shown in FIG. 4B proximate or in the opening defining the outlet to the first port 210. A third sound attenuating member 296 may be included as shown in FIG. 4B proximate or in the opening defining the inlet of the second port 212. A check valve may include any one or more of these first, second, and third sound attenuating members 292, 294, 296. The sound attenuating members are porous and may be or include any of the materials as discussed above.

The first sound attenuating member 292 may be a disc of porous material having a generally central bore therethrough or a partial bore therein to receive the pin 264, but is not limited thereto. The second and third sound attenuating members 294, 296, may be generally cylindrical plugs of porous material, but are not limited thereto. The check valves 202, 203 may also include any other sound attenuating features, materials, or members disclosed herein.

Figure 5:
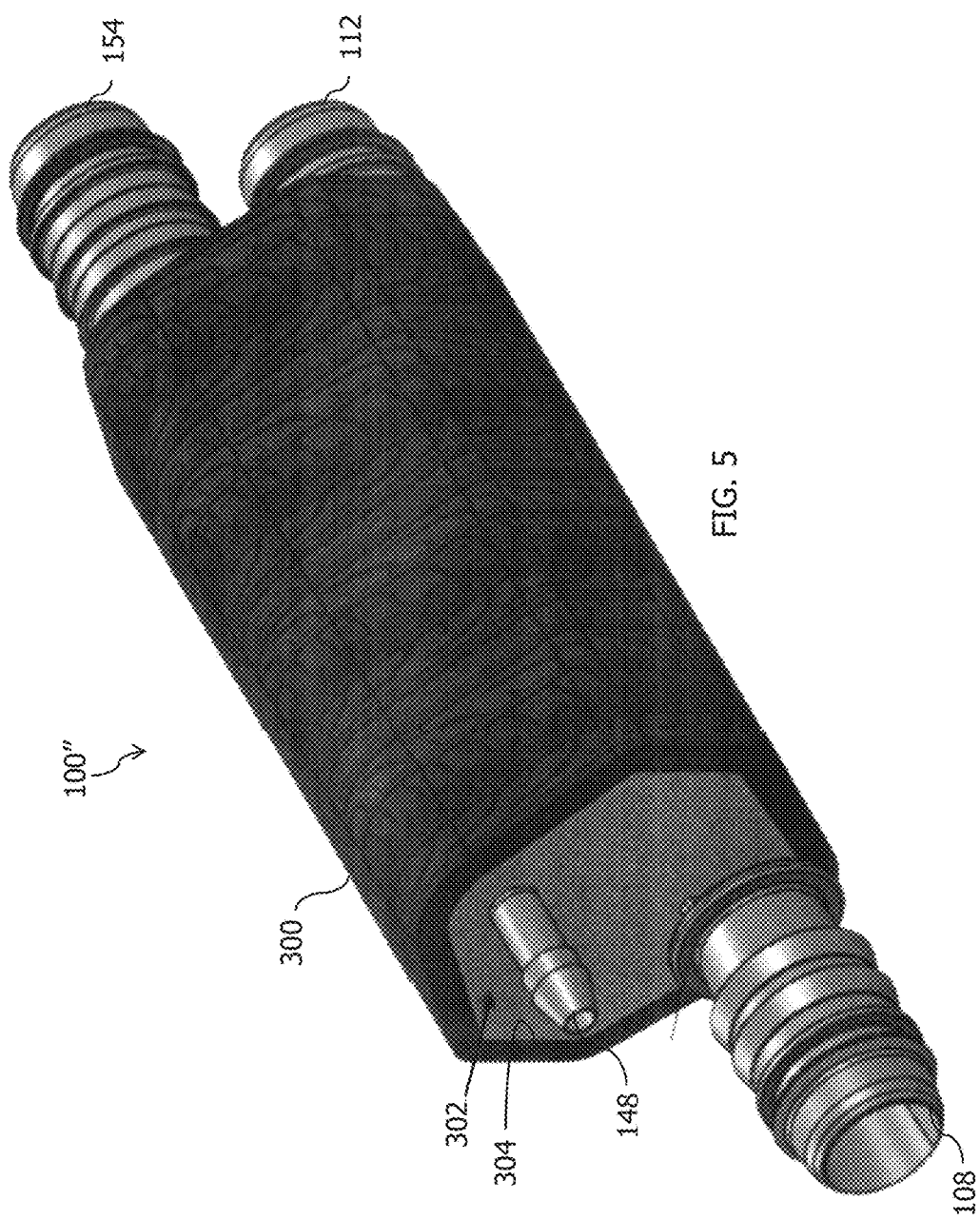
FIG. 5 is a side, perspective view of a third embodiment of an aspirator for attenuating noise from turbulent air flow.
Figure 6:
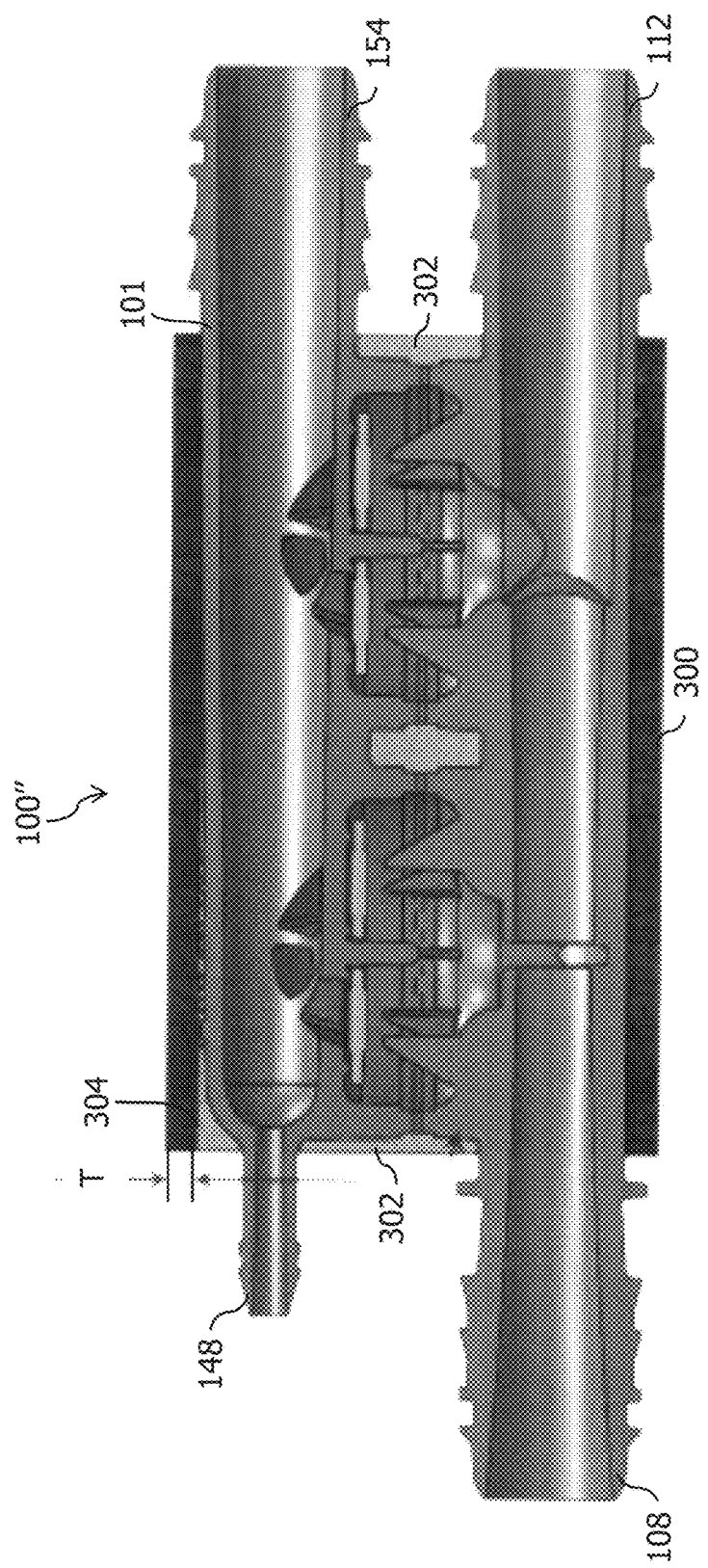
FIG. 6 is a side, longitudinal cross-sectional plan view of the aspirator of FIG. 5.

Referring now to FIGS. 5-6, a third embodiment of an aspirator-check valve assembly, generally designated 100", is disclosed. The aspirator-check valve assembly 100" functions in the same manner as described above with respect to the aspirator-check valve assemblies 100, 100'. The aspirator-check valve assembly 100" may include the housing 101, the check valves 111, 120, and/or any of other components earlier described with respect to the aspirator-check valve assemblies 100, 100'. The aspirator-check valve assembly 100" may optionally include one or more of the sound attenuating members 192, 194, 196.

The aspirator-check valve assembly 100" further includes a sound attenuating wrap 300 disposed about the outer surface of the housing 101. The sound attenuating wrap 300 may enclose the entire longitudinal length of the aspirator-check valve assembly 100, 100', 100" or only a portion thereof. The wrap 300 should not impede the use of the ports, such as the motive port 108, discharge port 112, and ports 148, 154. The sound attenuating wrap 300 may be secured about the housing 101 with tape, one or more retaining bands or sleeves, an adhesive, a system of ties, dovetail features, snap-fit members, or other suitable retention and/or mateable mechanism or combination thereof. If any one of bands, sleeves, or ties are used to secure the sound attenuating wrap 300 to the housing 101, they may also include an attachment feature or member for securing the assembly to the vehicle or system. The sound attenuating wrap 300 has a thickness T, labeled in FIG. 6, which may vary depending upon the specific use of the assembly 100", the material used to construct the wrap 300, the amount of the housing 101 encased by the wrap 300, and the retention mechanism used to couple the wrap 300 to the housing 101. In one embodiment, the thickness T may be about 1 mm to about 10 mm in thickness. In another embodiment, the thickness may be about 2 mm to about 5 mm.

Still referring to FIGS. 5 and 6, a sound-deadening material 302 may be interposed between the housing 101 and the sound attenuating wrap 300, and establishes a generally uniform outer surface 304 thereof (compared to the relatively complex shape of the irregular outer surface of the housing 101 itself) that may further receive the sound attenuating wrap 300. Compare, for example, FIG. 1, which shows the outer surface of housing 101, with FIG. 5, which shows outer surface 304 of the sound-deadening material 302, and with FIG. 8, which shows outer surface 304' of sound-deadening material 302'. The sound-deadening material 302 may be disposed about all or a portion of the outer surface of the housing 101 associated with the longitudinal length thereof enclosed by the wrap 300.

The sound attenuating wrap 300 and sound-deadening material 302 encapsulate the aspirator-check valve assembly 100", thereby preventing acoustic noise created inside the aspirator-check valve assembly 100" from being transmitted from the engine to the vehicle or other system in which the aspirator-check valve assembly 100" is disposed.

The wrap 300 can be made from a variety of insulation materials including metals, plastics, ceramics, glass, or a combination thereof, including any of the materials suitable for use for the sound attenuating members 192, 194, 196. The sound-deadening material 302 may similarly be formed of any of these materials, including foamable material, including those that have insulating properties.

Figure 7:
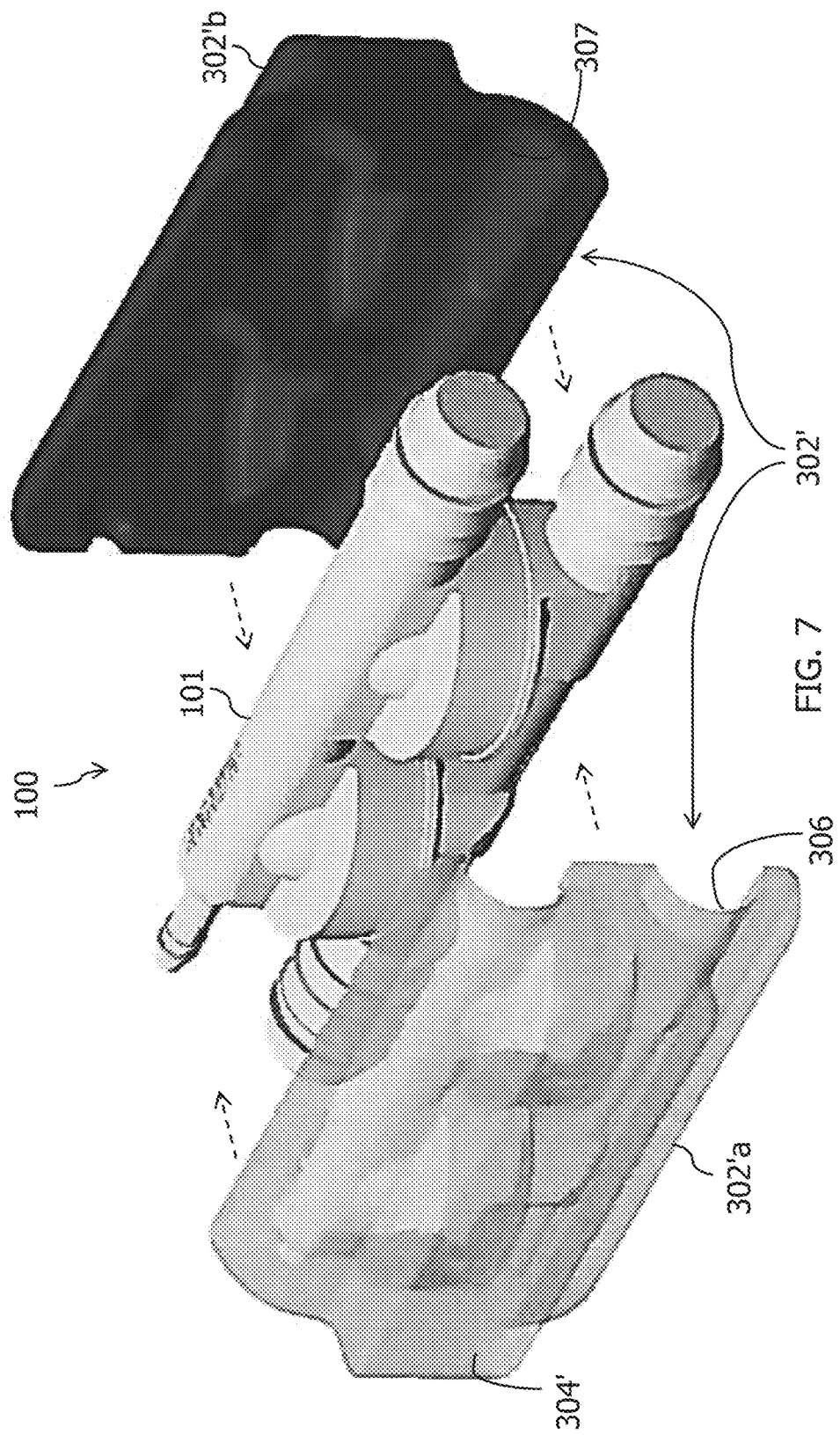
FIG. 7 is an exploded, perspective view of a fourth embodiment of an aspirator for attenuating noise from turbulent air flow.
Figure 8:
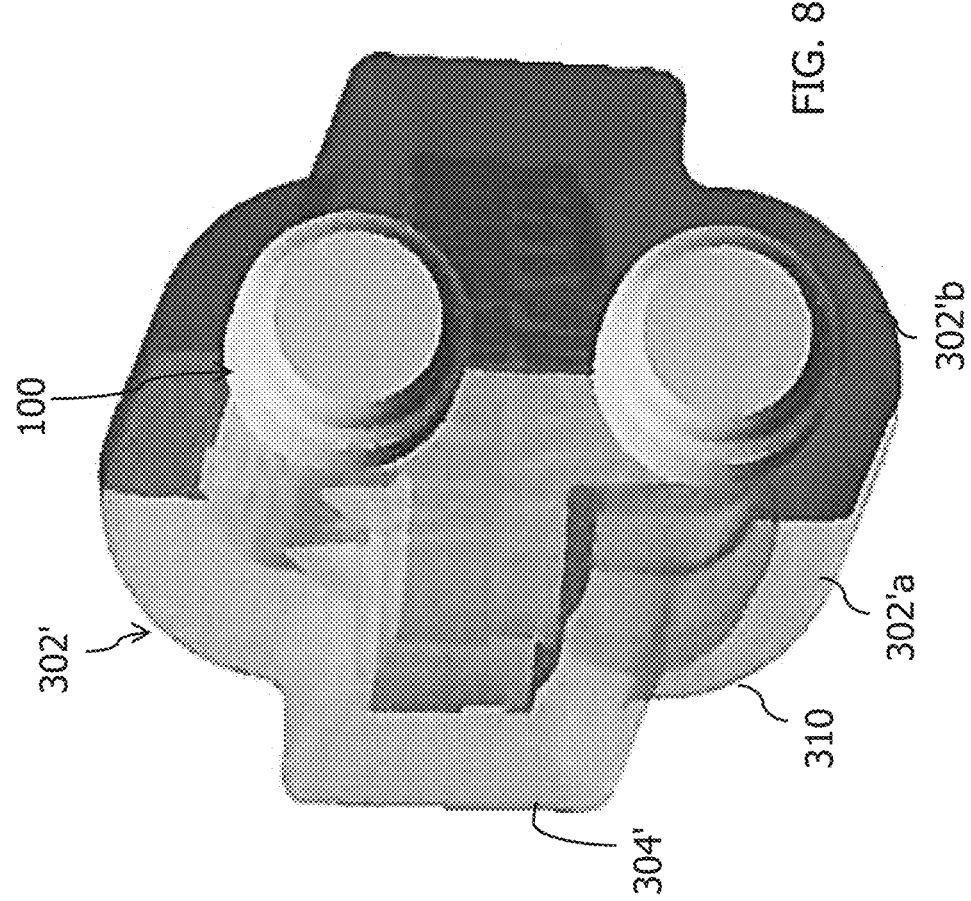
FIG. 8 is an assembled, end, perspective view of the aspirator of FIG. 7.

In another embodiment, the sound-deadening material may be molded to conform with the contours of the outer surface of the housing 101, as shown in FIGS. 7 and 8, thereby forming a close-fitting sleeve of the sound-deadening material 302' about the housing 101. The molded sound-deadening material 302' may be made from an acoustic dampening material that can withstand the operating conditions of the system it is incorporated into, such as a vehicle engine system and its temperature(s), vibration, exposure to oil, fuel, and or exhaust products, and moisture. Suitable materials include moldable foam and/or non-woven fabric available from Wm. T. Burnett & Co., Baltimore, Md. For example, but not limited to, moldable foams include polyether or polyester foams; non-woven fabrics include metal wools; felts include animal, mineral wool, or jute felt; and combinations thereof.

As illustrated in FIGS. 7 and 8, the molded sound-deadening material 302' may be present as multiple molded portions that mate together to define the close-fitting sleeve 310. Here, the molded portions include a first molded portion 302'a and a second molded portion 302'b divided along a vertical plane (relative to the orientation of the drawings as illustrated on the page) aligned with the central longitudinal axis B of the assembly 100. In other embodiments, the molded portions may include three or more pieces that mate to define the close-fitting sleeve. The molded portions may be divided along a horizontal plane (relative to the orientation of the drawings as illustrated on the page), at a bisection between the two check valves, etc. Each of the molded portions 302'a, 302'b has an inner surface 306, 307, respectively, that is contoured to match the contours of a portion of the exterior surface of the housing 101. As shown in FIG. 8, the plurality of molded portions 302'a, 302'b are seated against the exterior surface of the housing and are connected together and/or to the housing by a retention mechanism.

The retention mechanism may include tape, one or more retaining bands or sleeves, an adhesive, a system of one or more ties, dovetail features, snap-fit members, or other suitable mateable mechanism, and combinations thereof. If any one of bands. sleeves, or ties are used to secure the sound-deadening material 302' to the housing 101, they may also include an attachment feature or member for securing or be long enough to secure the assembly to the vehicle or system in which the device is incorporated.

Figure 9:
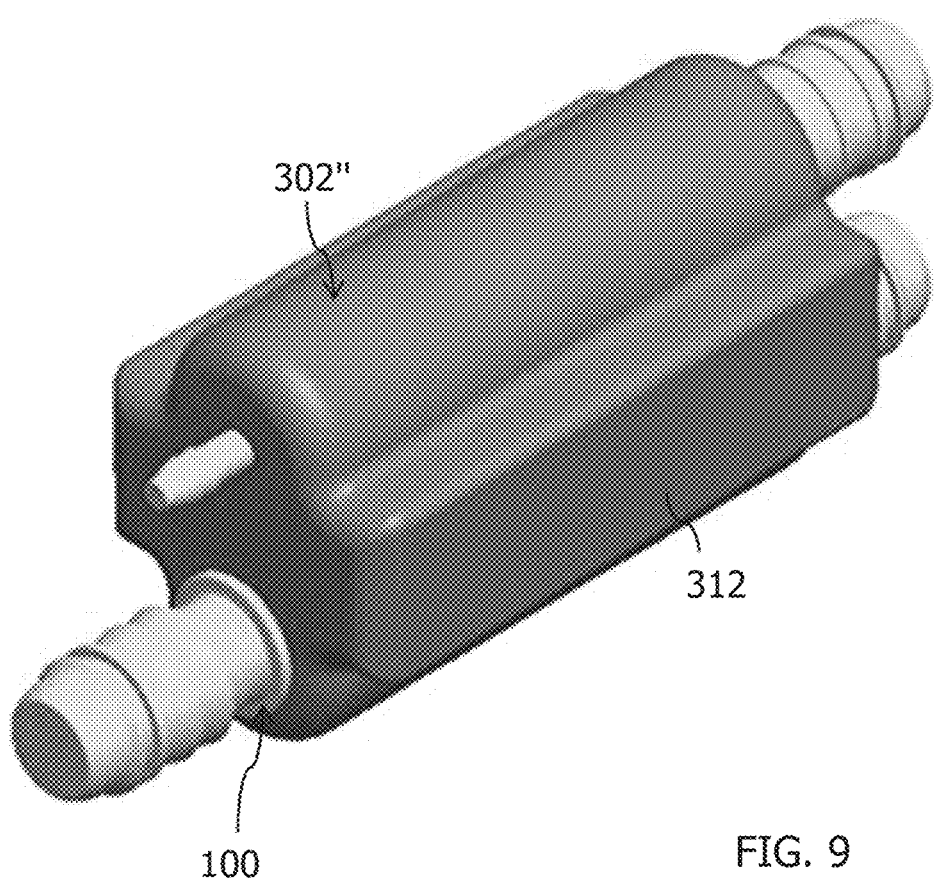
FIG. 9 is a side, perspective view of a fifth embodiment of an aspirator for attenuating noise from turbulent flow.

In another embodiment, the sound-deadening material may be an overmolded sound-deadening material 302" as shown in FIG. 9. Here, the sound-deadening material 302" defines a close-fitting seamless sleeve 312 about the housing 101. To form the seamless sleeve 312, a completed Venturi device or check valve is placed in an injection molding machine (not shown) in a fixture positioning the Venturi device or check valve with a preselected clearance distance between the interior surfaces of a mold and the exterior surfaces of the Venturi device or check valve, thereby defining a gap in which the sound-deadening material is received. In one embodiment, the sound-deadening material is injected using an injection molding technique and/or injection molding device into the gap. The sound-deadening material may be any material that absorbs sound and withstands the environmental conditions the Venturi device or check valve will experience once connected to a system, but is also a material suitable for injection into the gap at a temperature below the softening and/or melting point of the material defining the Venturi device or check valve, For example, but not limited to, polyester foam.

In the embodiments of FIGS. 7-9, the outer sound attenuating wrap 300 (FIGS. 5 and 6) is optional.

Having described the invention in detail and by reference to preferred embodiments thereof, it will be apparent that modifications and variations are possible without departing from the scope of the invention which is defined in the appended claims.

What is claimed is:

1. A Venturi device for producing vacuum comprising:
a housing defining a motive port, a suction port, a discharge port, a first flow passage between the motive port and the discharge port comprising a first tapering portion aligned end to end with a second tapering portion and spaced a distance apart from the second tapering port to define a fluid junction in fluid communication with the suction port, and a discharge section downstream of the second tapering portion, wherein the first tapering portion converges toward the fluid junction and the second tapering portion diverges from the fluid junction, and the housing further defining a second flow passage comprising an inlet port, a first port in fluid communication with the suction port, and a second port in fluid communication with the discharge section of the first flow passage, wherein the housing has an exterior surface;
a first check valve incorporated into the housing and positioned to control fluid flow through the suction port;
a second check valve incorporated into the housing and positioned to control fluid flow between the second port and the discharge section;
a first sound attenuating member disposed downstream of the first check valve within the second tapering portion; and
a sound attenuating material seated against the exterior surface of the housing, thereby encapsulating the first check valve and all or a portion of the housing defining the first flow passage and the second flow passage.

2. The Venturi device of claim 1, further comprising a second sound attenuating member disposed in the second flow passage or in the second check valve.

3. The Venturi device of claim 2, wherein the first and second sound attenuating members comprise a plug of porous sound attenuating material.

4. The Venturi device of claim 3, wherein the first and second sound attenuating members comprise metals, plastics, ceramics, or glass.

5. The Venturi device of claim 3, wherein the first and second sound attenuating members comprise wire, woven or matted, sintered particles, woven or matted fibers, and combinations thereof.

6. The Venturi device of claim 1, further comprising a second sound attenuating member disposed in the first flow passage proximate to or in the discharge port.

7. The Venturi device of claim 1, wherein the sound attenuating material about the outer surface of the housing includes a first member conformed to the contours of the exterior surface of the housing and a second member surrounding the first member, wherein the first member is interposed between the housing and the second member.

8. The Venturi device of claim 7, wherein the first member is a foamable material.

9. The Venturi device of claim 7, wherein the first member is molded to the contours of the exterior surface of the housing, and defines a more uniform outer surface once molded thereto.

10. The Venturi device of claim 7, wherein the first member and the second member comprise different materials.

11. The Venturi device of claim 1, wherein the sound attenuating material about the outer surface of the housing is molded to the contours of the exterior surface of the housing, and defines a seamless sleeve having a more uniform outer surface than the housing.

12. The Venturi device of claim 1, wherein the sound attenuating material comprises a plurality of molded portions each having an inner surface contoured to match the contours of a portion of the exterior surface of the housing, wherein the plurality of molded portions are seated against the exterior surface of the housing and are connected together and/or to the housing by a retention mechanism.

* * * * *